（12）United States Patent
Kauffman et al.

(10) Patent No.: US 10,844,253 B2
(45) Date of Patent: Nov. 24, 2020

(54) HOT MELT ADHESIVE COMPOSITIONS THAT INCLUDE SEMI-CRYSTALLINE PROPYLENE POLYMER AND WAX AND ARTICLES INCLUDING THE SAME

(71) Applicant: H.B. Fuller Company, St. Paul, MN (US)

(72) Inventors: Thomas F. Kauffman, Woodbury, MN (US); Scott C. Schmidt, Woodbury, MN (US); Claudia Mosanu, Blaine, MN (US); Timothy W. Roska, Forest Lake, MN (US); Amanda L. Schmit, Wyoming, MN (US); Sharf U. Ahmed, Woodbury, MN (US); Gary J. Roy, Vadnais Heights, MN (US)

(73) Assignee: H.B. Fuller Company, St. Paul, MN (US)

( * ) Notice: Subject to any disclaimer, the term of this patent is extended or adjusted under 35 U.S.C. 154(b) by 824 days.

(21) Appl. No.: 14/934,789

(22) Filed: Nov. 6, 2015

(65) Prior Publication Data
US 2016/0130480 A1 May 12, 2016

Related U.S. Application Data

(60) Provisional application No. 62/076,551, filed on Nov. 7, 2014.

(51) Int. Cl.
| | | |
|---|---|---|
| C08L 23/10 | (2006.01) | |
| C09J 123/14 | (2006.01) | |
| C09J 9/00 | (2006.01) | |
| C09J 11/08 | (2006.01) | |
| B32B 5/26 | (2006.01) | |
| B32B 7/12 | (2006.01) | |
| B32B 1/02 | (2006.01) | |
| B32B 25/06 | (2006.01) | |
| B32B 27/30 | (2006.01) | |
| C08L 53/02 | (2006.01) | |
| B32B 27/12 | (2006.01) | |
| B32B 25/04 | (2006.01) | |
| B32B 27/10 | (2006.01) | |
| B32B 3/26 | (2006.01) | |
| B32B 5/08 | (2006.01) | |
| B32B 29/00 | (2006.01) | |
| C08L 23/12 | (2006.01) | |
| C08L 51/06 | (2006.01) | |
| B32B 27/18 | (2006.01) | |
| B32B 27/32 | (2006.01) | |
| C08L 23/14 | (2006.01) | |
| B32B 25/14 | (2006.01) | |
| B32B 5/22 | (2006.01) | |
| B32B 27/06 | (2006.01) | |
| B32B 25/10 | (2006.01) | |
| C08L 23/06 | (2006.01) | |

(52) U.S. Cl.
CPC ............ *C09J 123/142* (2013.01); *B32B 1/02* (2013.01); *B32B 3/266* (2013.01); *B32B 5/08* (2013.01); *B32B 5/22* (2013.01); *B32B 5/26* (2013.01); *B32B 7/12* (2013.01); *B32B 25/04* (2013.01); *B32B 25/06* (2013.01); *B32B 25/10* (2013.01); *B32B 25/14* (2013.01); *B32B 27/06* (2013.01); *B32B 27/10* (2013.01); *B32B 27/12* (2013.01); *B32B 27/18* (2013.01); *B32B 27/30* (2013.01); *B32B 27/302* (2013.01); *B32B 27/32* (2013.01); *B32B 27/327* (2013.01); *B32B 29/005* (2013.01); *C08L 23/06* (2013.01); *C08L 23/12* (2013.01); *C08L 23/14* (2013.01); *C08L 23/142* (2013.01); *C08L 51/06* (2013.01); *C08L 53/025* (2013.01); *C09J 9/00* (2013.01); *C09J 11/08* (2013.01); *B32B 2262/02* (2013.01); *B32B 2262/06* (2013.01); *B32B 2262/08* (2013.01); *B32B 2262/101* (2013.01); *B32B 2262/14* (2013.01); *B32B 2307/306* (2013.01); *B32B 2307/31* (2013.01); *B32B 2405/00* (2013.01); *B32B 2439/00* (2013.01); *B32B 2553/00* (2013.01); *B32B 2555/00* (2013.01); *C08L 2205/025* (2013.01); *Y02P 20/582* (2015.11)

(58) Field of Classification Search
CPC ....... C08L 23/10; C08L 23/14; C08L 2205/02
USPC ................................ 428/34.7, 35.1
See application file for complete search history.

(56) References Cited

U.S. PATENT DOCUMENTS

| | | | |
|---|---|---|---|
| 6,747,114 B2 | 6/2004 | Karandinos et al. | |
| 7,294,681 B2 | 11/2007 | Jiang et al. | |
| 7,541,402 B2 | 6/2009 | Abhari et al. | |
| 7,550,528 B2 | 6/2009 | Abhari et al. | |
| 7,645,829 B2 | 1/2010 | Tse et al. | |
| 7,700,707 B2 | 4/2010 | Abhari et al. | |
| 8,242,198 B2 | 8/2012 | Jiang et al. | |
| 8,283,400 B2 | 10/2012 | Rodriguez et al. | |
| 8,536,268 B2 | 9/2013 | Karjala et al. | |
| 8,614,271 B2 | 12/2013 | Davis et al. | |
| 8,653,169 B2 | 2/2014 | Jiang et al. | |
| 8,653,199 B2 | 2/2014 | Abhari et al. | |

(Continued)

FOREIGN PATENT DOCUMENTS

| | | |
|---|---|---|
| EP | 2 261 292 A2 | 12/2010 |
| WO | WO2012/051239 | * 4/2012 |

OTHER PUBLICATIONS

Bach, Sebastijan "Feica Izmir 2013: C2/C3 Based Metallocene Polymers and Waxes for the Hot Melt Industry," Sep. 2013, 35 pages, Clariant Company, Germany.

(Continued)

*Primary Examiner* — Ellen S Hock
(74) *Attorney, Agent, or Firm* — Allison Johnson 36173; Kirsten Stone

(57) ABSTRACT

A hot melt adhesive composition that includes at least 40% by weight of an unmodified, semi-crystalline propylene polymer that includes at least 50% by weight propylene, and at least 15% by weight wax.

31 Claims, No Drawings

(56) References Cited

U.S. PATENT DOCUMENTS

| | | | |
|---|---|---|---|
| 2010/0132886 A1* | 6/2010 | Rodriguez | C09J 123/14 156/334 |
| 2010/0305259 A1 | 12/2010 | Rodriquez et al. | |
| 2013/0060215 A1 | 3/2013 | Knutson et al. | |
| 2013/0203900 A1 | 8/2013 | Ellis et al. | |
| 2013/0225752 A1 | 8/2013 | Tse et al. | |

OTHER PUBLICATIONS

Mclennaghan, Allan, et al., "Navigating Formulation Choices for Hot Melt Adhesives—Perspectives from a Global Polyolefin Producer," 2013, pp. 1-25, The Dow Chemical Company.

"Improving Hot-Melt Adhesives," *Adhesives & Sealants Industry Magazine*, Sep. 2013, pp. 24-25, Adhesives & Sealants Industry Magazine, Troy, USA.

* cited by examiner

HOT MELT ADHESIVE COMPOSITIONS THAT INCLUDE SEMI-CRYSTALLINE PROPYLENE POLYMER AND WAX AND ARTICLES INCLUDING THE SAME

This application claims the benefit of U.S. Provisional Application No. 62/076,551, filed Nov. 7, 2014, of which is incorporated herein.

BACKGROUND

The invention is directed to preparing hot melt adhesive compositions that include semi-crystalline propylene polymer and wax.

Hot melt adhesive compositions often include a polymer and a tackifying agent, and in some cases wax or oil. Hot melt adhesives used in packaging should exhibit good bond formation, heat resistance, and thermal stability, and a quick set time to be commercially useful. It is difficult to formulate propylene polymer-based hot melt adhesive compositions that are able to exhibit the performance properties that packaging adhesives must meet in order to be commercially useful. Tackifying agents, for example, can cause the hot melt adhesive to discolor and char. Waxes can have a detrimental effect on the adhesive bond formation properties of a polypropylene hot melt adhesive composition. This is particularly true of waxes that have a high degree of crystallinity. Oil has been known to decrease the set speed of hot melt adhesive compositions. Oil also can bleed out from a hot melt adhesive composition and cause undesirable staining of the substrates to which it is bonded.

It would be desirable to obtain a hot melt adhesive composition based on propylene polymer that exhibits good adhesion at low and high temperatures, thermal stability, a fast set time, and minimal to no oil staining and oil migration.

SUMMARY

In one aspect, the invention features a hot melt adhesive composition that includes at least 55% by weight of an unmodified, semi-crystalline propylene polymer that includes at least 50% by weight propylene, at least 15% by weight of a first non-functionalized wax, and a second wax different from the first wax. In some embodiments, the hot melt adhesive composition includes greater than 20% by weight wax.

In another aspect, the invention features a hot melt adhesive composition that includes at least 55% by weight of a semi-crystalline propylene polymer that includes at least 50% by weight propylene, and greater than 20% by weight wax, the wax including from 0% by weight to no greater than 10% by weight, based on the weight of the hot melt adhesive composition, functionalized wax, and the composition exhibiting a set time of no greater than 2 seconds. In one embodiment, the wax includes a first wax and a second wax different from the first wax.

In some embodiments, the hot melt adhesive composition includes no greater than 10% by weight tackifying agent.

In one embodiment, the second wax includes a functionalized wax.

In another embodiment, the semi-crystalline propylene polymer is a metallocene catalyzed propylene polymer. In some embodiments, the semi-crystalline propylene polymer has a heat of fusion of from 15 J/g to no greater than 50 J/g. In one embodiment, the semi-crystalline propylene polymer has a heat of fusion of from 15 Jig to no greater than 45 J/g.

In another embodiment, the first non-functionalized wax has a melting point greater than 80° C. In some embodiments, the first non-functionalized wax has a melting point greater than 100° C. In other embodiments, the first non-functionalized wax has a melting point greater than 115° C. In one embodiment, the second wax has a melting point greater than 115° C. In some embodiments, the first non-functionalized wax has a melting point greater than 115° C. and the composition exhibits a set time no greater than 2 seconds. In some embodiments, the first non-functionalized wax has a melting point greater than 115° C., and the second wax has a melting point greater than 115° C.

In some embodiments, the composition exhibits a set time no greater than 5 seconds. In other embodiments, the composition exhibits a set time no greater than 2 seconds.

In one embodiment, the composition exhibits a heat stress resistance of greater than 71° C. In other embodiments, the composition exhibits a heat stress resistance of greater than 76° C. In some embodiments, the composition exhibits a heat stress resistance of greater than 71° C. and a set time no greater than 2 seconds. In one embodiment, the composition exhibits a heat stress resistance of greater than 71° C. and a set time no greater than 2 seconds, and the first non-functionalized wax includes at least one of polyethylene wax and Fischer-Tropsch wax, and the second wax includes non-functionalized polypropylene wax, maleated polyethylene wax, maleated polypropylene wax, or a combination thereof.

In another embodiment, the composition exhibits greater than 25% fiber tear at −18° C., and greater than 25% fiber tear at 60° C. In other embodiments, the composition exhibits greater than 25% fiber tear at 4° C. and greater than 25% fiber tear at 60° C. In still other embodiments, the composition exhibits greater than 25% fiber tear at 4° C. and greater than 25% fiber tear at 71° C.

In one embodiment, the hot melt adhesive composition further includes oil, polybutene, or a combination thereof. In other embodiments, the hot melt adhesive composition further includes tackifying agent. In one embodiment, the hot melt adhesive composition includes no greater than 7% by weight tackifying agent.

In some embodiments, the composition exhibits a viscosity of no greater than 2000 centipoise at 177° C. In other embodiments, the composition exhibits a viscosity of no greater than 1200 centipoise at 177° C.

In one embodiment, the first non-functionalized wax includes polyethylene wax, and the second wax includes non-functionalized polypropylene wax, maleated polyethylene wax, maleated polypropylene wax, or a combination thereof. In some embodiments, the first non-functionalized wax exhibits a melting point greater than 115° C. and includes at least one of polyethylene wax and Fischer-Tropsch wax, and the second wax includes maleated polyethylene wax, maleated polypropylene wax, or a combination thereof. In other embodiments, the first non-functionalized wax includes polyethylene wax, and the second wax includes maleated polyethylene wax, maleated polypropylene wax, or a combination thereof.

In some embodiments, the hot melt adhesive composition includes from 55% by weight to about 84% by weight semi-crystalline propylene polymer, from about 20% by weight to about 35% by weight first non-functionalized wax, and from about 1% by weight to about 10% by weight second wax. In one embodiment, the composition exhibits a set time of no greater than 2 seconds. In other embodiments, the composition exhibits a set time of no greater than 1 second.

In other embodiments, the hot melt adhesive composition includes from 60% by weight to about 80% by weight polypropylene polymer.

In one embodiment, the semi-crystalline propylene polymer includes a propylene-alphaolefin copolymer. In another embodiment, the semi-crystalline propylene polymer includes propylene-hexene copolymer, propylene-octene, propylene-butene copolymer, propylene-ethylene copolymer, or a combination thereof. In some embodiments, the semi-crystalline propylene polymer exhibits a viscosity of no greater than 2,000 cP at 190° C. In other embodiments, the semi-crystalline propylene polymer exhibits a viscosity of no greater than 1200 cP at 190° C. In another embodiment, the hot melt adhesive composition exhibits a heat stress resistance of greater than 71° C., greater than 25% fiber tear at −18° C., and greater than 25% fiber tear at 60° C.

In another embodiment, the composition exhibits a viscosity of no greater than 1500 centipoise at 149° C.

In another aspect, the invention features a package that includes a hot melt adhesive composition described herein, a first substrate that includes fibers, and a second substrate that includes fibers, the second substrate bonded to the first substrate through the adhesive composition. In one embodiment, the adhesive exhibits a fiber tearing bond to at least one of the first substrate and the second substrate at −18° C. and at 60° C.

In another aspect, the invention features a hot melt adhesive composition that includes at least 40% by weight of an unmodified, semi-crystalline propylene polymer that includes at least 50% by weight propylene, at least 15% by weight non-functionalized wax, the non-functionalized wax includes a first non-functionalized wax and a second non-functionalized wax different from the first non-functionalized wax, and no greater than 8% by weight of an ethylene-ethylenically unsaturated ester copolymer. In one embodiment, the adhesive composition further includes an elastomeric block copolymer that includes styrene. In some embodiments, the elastomeric block copolymer is selected from the group consisting of styrene-ethylene/butylene-styrene block copolymer, styrene-ethylene/propylene-styrene block copolymer, and combinations thereof.

In other aspects, the invention features a hot melt adhesive composition that includes at least 40% by weight of an unmodified, semi-crystalline propylene polymer that includes at least 50% by weight propylene, at least 15% by weight non-functionalized wax, from 0% by weight to no greater than 10% by weight functionalized wax, and from 1% by weight to 10% by weight elastomeric block copolymer that includes styrene.

In some embodiments, the adhesive composition includes at least 45% by weight unmodified, semi-crystalline propylene polymer. In other embodiments, the adhesive composition includes at least 50% by weight unmodified, semi-crystalline propylene polymer. In other embodiments, the adhesive composition includes at least 55% by weight of the unmodified, semi-crystalline propylene polymer.

In other embodiments, the adhesive composition includes from 45% by weight to about 70% by weight unmodified, semi-crystalline propylene polymer, from about 20% by weight to about 35% by weight non-functionalized wax, and from about 1% by weight to about 10% by weight functionalized wax.

In other embodiments, the unmodified, semi-crystalline propylene polymer exhibits a heat of fusion of from 15 J/g to no greater than 50 J/g.

In one embodiment, the first non-functionalized wax includes polyethylene wax, Fischer Tropsch wax, or a combination thereof. In some embodiments, the first non-functionalized wax has a melting point greater than 100° C. In other embodiments, the second non-functionalized wax has a melting point greater than 115° C.

In one embodiment, the adhesive composition further includes a functionalized wax. In some embodiments, the first non-functionalized wax includes polyethylene wax, Fischer Tropsch wax or a combination thereof, and the functionalized wax includes maleated polyethylene wax, maleated polypropylene wax, or a combination thereof.

In some embodiments, the first non-functionalized wax has a melting point greater than 100° C. In other embodiments, the first non-functionalized wax has a melting point greater than 100° C. and the second non-functionalized wax has a melting point greater than 110° C.

In some embodiments, the adhesive composition includes greater than 20% by weight wax.

In another embodiment, the adhesive composition exhibits a set time no greater than 2 seconds. In other embodiments, the adhesive composition exhibits a set time no greater than 1.5 seconds. In other embodiments, the adhesive composition exhibits a set time no greater than 1 second.

In some embodiments, the adhesive composition exhibits a heat stress resistance of greater than 60° C., greater than 50% fiber tear at 4° C. and greater than 50% fiber tear at 60° C., and a set time no greater than 2 seconds. In other embodiments, the adhesive composition exhibits a heat stress resistance of greater than 60° C., greater than 50% fiber tear at 4° C., greater than 50% fiber tear at 60° C., and a set time of no greater than 1.5 seconds. In another embodiment, the adhesive composition exhibits a heat stress resistance of greater than 71° C., greater than 50% fiber tear at 4° C., greater than 50% fiber tear at 71° C., and a set time of no greater than 1.5 seconds. In another embodiment, the adhesive composition exhibits a heat stress resistance of greater than 71° C., greater than 50% fiber tear at −18° C., greater than 50% fiber tear at 71° C., and a set time of no greater than 1.5 seconds.

In other embodiments, the adhesive composition further includes oil, polybutene, or a combination thereof.

In another embodiment, the adhesive composition exhibits a viscosity of no greater than 2000 centipoise at 177° C. In other embodiments, the adhesive composition exhibits a viscosity of no greater than 1500 centipoise at 149° C.

In other embodiments, the adhesive composition includes from 50% by weight to about 65% by weight unmodified, semi-crystalline polypropylene polymer.

In other embodiments, the unmodified, semi-crystalline propylene polymer exhibits a viscosity of no greater than 1200 cP at 190° C.

In another embodiment, the unmodified, semi-crystalline propylene polymer includes an unmodified, metallocene-catalyzed, semi-crystalline propylene polymer, an unmodified, non-metallocene heteroaryl-catalyzed, semi-crystalline propylene polymer, or a combination thereof.

In another embodiment, the unmodified, semi-crystalline propylene polymer includes an unmodified, metallocene-catalyzed, semi-crystalline propylene copolymer, an unmodified, non-metallocene heteroaryl-catalyzed, semi-crystalline propylene copolymer, or a combination thereof.

In other embodiments, the adhesive composition further includes from 15% by weight to 30% by weight tackifying agent.

In another aspect, the invention features a package that includes any of the hot melt adhesive compositions disclosed above, a first substrate that includes fibers, and a second substrate that includes fibers, the second substrate bonded to the first substrate through the adhesive composition.

The invention features a semi-crystalline propylene polymer-based hot melt adhesive composition that exhibits a fast set time, thermal stability, and good adhesion at low and high temperatures.

Other features and advantages will be apparent from the following description of the preferred embodiments and from the claims.

GLOSSARY

In reference to the invention, these terms have the meanings set forth below:

The term "wax" as used herein means a polymer or an oligomer having a heat of fusion greater than 60 Joules per gram and a viscosity no greater than 750 centipoise (cP) at 190° C.

The term "semi-crystalline polymer" means a polymer having a heat of fusion from greater than 10 J/g to no greater than 60 J/g and a viscosity of at least 750 cP at 190° C.

The term "unmodified polymer" means a polymer that has not been modified in the presence of a free radical initiator.

The term "non-functionalized wax" refers to a wax that is free of polar functional groups.

The term "functionalized wax" refers to a wax that has at least one polar functional group.

DETAILED DESCRIPTION

The hot melt adhesive composition includes at least 40% by weight of a semi-crystalline, propylene polymer that includes at least 50% by weight propylene, and wax. The hot melt adhesive composition exhibits a fast set time: preferably a set time of no greater than 5 seconds, no greater than 3 seconds, no greater than 2 seconds, no greater than 1.5 seconds, or even no greater than 1 second. The hot melt adhesive composition also exhibits a fiber tearing bond to fibrous packaging materials at both low and high temperatures. The hot melt adhesive composition preferably exhibits greater than 25%, greater than 30%, greater than 40%, greater than 45%, greater than 50%, or even greater than 70% fiber tear at 4° C., −18° C., or even at −29° C., and greater than 25%, greater than 30%, greater than 40%, greater than 45%, greater than 50%, or even greater than 70% fiber tear at 60° C., or even at 71° C.

The hot melt adhesive composition also exhibits good heat stress resistance, preferably a heat stress resistance of at least 54° C., at least 60° C., at least 66° C., at least 71° C., or even at least 76° C.

The hot melt adhesive composition preferably exhibits a viscosity of no greater than 5000 cP, no greater than about 3000 cP, no greater than about 2000 cP, no greater than about 1500 cP, no greater than about 1200 cP, or even no greater than about 1000 cP at 177° C., and a viscosity of no greater than about 3000 cP, no greater than about 2000 cP, or even no greater than about 1000 cP at 190° C. The hot melt adhesive composition can be formulated to exhibit a viscosity of no greater than 2000 cP, no greater than about 1500 cP, no greater than about 1300 cP, or even no greater than about 1200 cP at 149° C., or even 135° C.

The hot melt adhesive composition also exhibits good thermal stability. Two measures of thermal stability are the change in viscosity over time and the presence of charring. After conditioning for 200 hours at 177° C., the hot melt adhesive composition preferably exhibits no greater than a 20%, or even no greater than a 10% change in viscosity relative to its initial viscosity at 177° C., and exhibits minimal charring or even is free of charring and skin formation, i.e., the formation of a skin coat on the surface of the composition.

The hot melt adhesive composition also preferably exhibits an initial Gardner color of no greater than 3, no greater than 2, or even no greater than 1.

Semi-Crystalline Propylene Polymer

The propylene polymer is semi-crystalline and exhibits a heat of fusion of from greater than 10 Joules per gram (J/g) to no greater than 60 J/g, from about 15 J/g to about 50 J/g, or even from about 15 J/g to about 45 J/g. The propylene polymer exhibits a viscosity of at least 750 cP, no greater than 5,000 cP, no greater than 4,000 cP, no greater than 3,000 cP, no greater than 2,000 cP, or even no greater than 1,000 cP at 190° C.

The propylene polymer preferably exhibits a glass transition temperature (Tg) of no greater than −10° C., no greater than −20° C., or even no greater than −30° C.

Useful propylene polymers include, e.g., polypropylene homopolymers (i.e., 100 mole % propylene), propylene copolymers (i.e., copolymer, terpolymer, and higher order polymers), a mixture of at least two different propylene polymers including, e.g., a blend that includes a polypropylene homopolymer and a propylene copolymer, a blend that includes different polypropylene homopolymers, a blend that includes different propylene copolymers, and various combinations thereof. Useful propylene polymers also include, e.g., modified, unmodified, grafted, and ungrafted propylene polymers, uni-modal propylene polymers, multi-modal propylene polymers, and combinations thereof. The term "multi-modal" means the polymer has a multi-modal molecular weight distribution (weight average molecular weight (Mw)/number average molecular weight (Mn)) as determined by Size Exclusion Chromatography (SEC). A multi-modal molecular weight distribution exists when the SEC trace has more than one peak or inflection point (i.e., two or more inflection points). An inflection point is the point at which the second derivative changes in sign (e.g., from negative to positive or vice versa). The term "uni-modal" means the polymer has a uni-modal molecular weight distribution (Mw/Mn) as determined by SEC. A uni-modal molecular weight distribution exists when the SEC trace has only one peak.

Useful propylene copolymers are derived from propylene and an alpha-olefin co-monomer (e.g., alpha-olefin monomers having at least two carbon atoms, at least four carbon atoms, from four carbon atoms to eight carbon atoms, and combinations of such monomers). Examples of suitable classes of alpha-olefin co-monomers include mono-alpha olefins (i.e., one unsaturated double bond) and higher order alpha olefins (e.g., dienes (e.g., 1,9-decadiene)). Useful alpha-olefin monomers include, e.g., ethylene, butene, pentene, hexene, heptene, octene, nonene, decene, dodecene, 4-methyl-pentene-1,3-methyl pentene-1,3,5,5-trimethyl-hexene-1,5-ethyl-1-nonene, and combinations thereof. Specific examples of suitable propylene-alpha-olefin copolymers include propylene-ethylene, propylene-butene, propylene-hexene, propylene-octene, and combinations thereof.

Propylene copolymers preferably include at least 1% by weight, at least 2% by weight, at least about 5% by weight, at least about 10% by weight, no greater than 50% by weight, no greater than about 40% by weight, no greater than 30% by weight, no greater than 20% by weight, no greater than 17% by weight, no greater than 15% by weight, or even no greater than 10% by weight alpha-olefin co-monomer, and at least 50% by weight, at least about 60% by weight, no greater than 99% by weight, no greater than 98% by weight, no greater than 95% by weight, no greater than 90% by weight, from about 50% by weight to about 99% by weight, from about 60% by weight to about 99% by weight, or even from about 70% by weight to about 99% by weight propylene.

Useful propylene polymers include propylene polymers prepared using a variety of catalysts including, e.g., a single site catalyst (e.g., metallocene catalysts (e.g., metallocene-catalyzed propylene polymers)), multiple single site catalysts, non-metallocene heteroaryl catalysts, and combinations thereof. Other suitable polymers include polymers prepared by grafting an amorphous propylene polymer onto a semi-crystalline polymer, examples of which and methods of making the same are disclosed, e.g., in U.S. Pat. No. 7,541,402 (Abhari et al.), and incorporated herein. The propylene polymer can include blocks of isotactic polypropylene and blocks of atactic polypropylene.

Suitable propylene polymers are commercially available under a variety of trade designations including, e.g., VISTAMAXX 8880 propylene-ethylene copolymer, VISTAMAXX 8816 propylene-hexene copolymer, and LINXAR propylene-hexene copolymers from ExxonMobil Chemical Company (Houston, Tex.) including LINXAR 127, and LICOCENE propylene-ethylene copolymers from Clariant Int'l Ltd. (Muttenz, Switzerland) including, e.g., LICOCENE PP 1502 TP, PP 1602 TP, and PP 2602 TP.

The hot melt adhesive composition includes at least 40% by weight, at least 45% by weight, at least 50% by weight, at least 55% by weight, no greater than about 84% by weight, no greater than about 80% by weight, no greater than about 75% by weight, than about 70% by weight, no greater than about 65% by weight, no greater than about 60% by weight, from about 40% by weight to about 84% by weight, from about 45% by weight to about 80% by weight, or even from about 45% by weight to about 60% by weight, propylene polymer.

Wax

The hot melt adhesive composition includes at least two different waxes (e.g., at least two different non-functionalized waxes, at least two different functionalized waxes, a functionalized wax and a non-functionalized wax, and combinations thereof). The hot melt adhesives composition includes at least 15% by weight, greater than 15% by weight, greater than 20% by weight, from 20% by weight to 35% by weight, from at least 15% by weight to about 35% by weight, from greater than 15% by weight to about 35% by weight, or even from about 15% by weight to about 30% by weight wax.

Non-Functionalized Wax

Useful non-functionalized waxes have a melting point of at least 50° C., at least 60° C., at least 80° C., at least 100° C. or even at least 115° C., and a heat of fusion of greater than 60 J/g, or even greater than 70 J/g. Examples of suitable non-functionalized waxes include polyolefin waxes (e.g., polypropylene waxes and polyethylene waxes), Fischer Tropsch waxes, paraffin waxes, microcrystalline waxes, metallocene waxes, and combinations thereof (e.g., a combination of two non-functionalized waxes each having a melting point of at least 115° C.). The hot melt adhesive composition preferably includes at least 15% by weight, greater than 15% by weight, greater than 20% by weight, from at least 15% by weight to about 35% by weight, from greater than 15% by weight to about 35% by weight, or even from about 15% by weight to about 30% by weight non-functionalized wax.

Useful polyethylene waxes are commercially available under a variety of trade designations including, e.g., the EPOLENE series of trade designations from Westlake Chemical Corporation (Houston, Tex.) including, e.g., EPOLENE N-21 and N-14 polyethylene waxes, the BARECO series of trade designations from Baker Hughes Inc. (Sugar Land, Tex.) including, e.g., BARECO C4040 polyethylene wax, the AC series of trade designations from Honeywell Int'l Inc. (Morristown, N.J.) including, e.g., A-C 8 and A-C 9 polyethylene waxes, the POLYWAX series of trade designations including POLYWAX 3000 polyethylene wax from Baker Hughes (Houston, Tex.), and CWP 400 polyethylene wax from SSI CHUSEI, Inc. (Pasedena, Tex.). The hot melt adhesive composition can include from 0% by weight to about 35% by weight, at least 1% by weight, at least 7% by weight, at least 10% by weight, from about 1% by weight to about 30% by weight, from about 1% by weight to about 25% by weight, from about 5% by weight to about 20% by weight, or even from about 5% by weight to about 15% by weight polyethylene wax.

Useful polypropylene waxes are commercially available under a variety of trade designations including, e.g., EPOLENE N-15 from Westlake Chemical, HONEYWELL AC1089 from Honeywell Int'l Inc., and LICOCENE 6102 from Clariant Int'l Ltd. (Muttenz, Switzerland). The hot melt adhesive composition can include from 0% by weight to about 35% by weight, from about 1% by weight to about 25% by weight, or even from about 1% by weight to about 20% by weight polypropylene wax.

Useful Fischer Tropsch waxes are commercially available under a variety of trade designations including, e.g., the BARECO series of trade designations from Baker Hughes Inc. (Sugar Land, Tex.) including, e.g., BARECO PX-100 and PX-105 Fischer Tropsch waxes, the SHELLWAX series of trade designations from Shell Malaysia Ltd. (Kuala Lumpur, Malaysia) including, e.g., SHELLWAX SX100 and SX105 Fischer Tropsch waxes, the VESTOWAX series of trade designations from Evonik Industries AG (Germany) including, e.g., VESTOWAX 2050 Fischer Tropsch wax, and the SASOLWAX series of trade designations from Sasol Wax North America Corporation (Hayward, Calif.) including, e.g., SASOLWAX H105, C80, H1, and H4 Fischer Tropsch waxes. The hot melt adhesive composition can include from 0% by weight to about 35% by weight, at least 1% by weight, at least about 5% by weight, from about 1% by weight to about 30% by weight, from about 1% by weight to about 25% by weight, from about 5% by weight to about 10% by weight, or even from about 4% by weight to about 8% by weight Fischer Tropsch wax.

Useful paraffin waxes are available under a variety of trade designations including, e.g., PARVAN 1580 and 1520 paraffin waxes from ExxonMobil Chemical Company (Houston, Tex.) and CALUMET FR-6513 from Calumet Specialty Products Partners, LP (Indianapolis, Ind.). The hot melt adhesive composition can include from 0% by weight to about 35% by weight, from about 1% by weight to about 25% by weight, from about 1% by weight to about 20% by weight, or even from about 0% by weight to about 15% by weight paraffin wax.

Functionalized Wax

Useful functionalized waxes have a melting point of at least 50° C., at least 60° C., at least 80° C., at least 100° C. or even at least 115° C., and a heat of fusion of greater than 60 J/g, or even greater than 70 J/g. Examples of suitable functionalized waxes include functionalized polypropylene wax (e.g., maleated polypropylene wax and oxidized polypropylene wax), functionalized polyethylene wax (e.g., maleated polyethylene wax and oxidized polyethylene wax), polar waxes, functionalized stearamide waxes (e.g., hydroxystearamide, N-(2-hydroxy ethyl)-12-hydroxystearamide, N,N'-ethylene bis 12-hydroxystearamide, and 12-hydroxy stearic acid N,N'ethylene-bis stearamide), and combinations thereof. Useful commercially available functionalized waxes include, e.g., A-C 597P, A-C 596P, and A-C 1325 maleated polypropylene waxes and A-C 573 maleated polyethylene wax all of which are available from Honeywell Int'l Inc. (Morristown, N.J.), and Westlake E 43 maleated polypropylene wax available from Westlake Chemical Corporation (Houston, Tex.).

The functionalized wax can be present in the hot melt adhesive composition in an amount from about 0% by weight to no greater than 10% by weight, from about 1% by weight to no greater than 10% by weight, from about 0.2% by weight to about 5% by weight, from about 1% by weight to about 4% by weight, from about 2% by weight to about 3.5% by weight, no greater than 2% by weight, or even no greater than 1% by weight. Optionally, the hot melt adhesive composition is free of functionalized wax.

Oil

The hot melt adhesive composition optionally includes oil. Useful classes of oils include, e.g., naphthenic petroleum-based oils, paraffinic oils (e.g., cycloparaffin oils), mineral oils, animal oils, vegetable oils, synthetic oils, derivatives of oils, glycerol esters of fatty acids, and combinations thereof.

Useful commercially available oils include KAYDOL OIL from Sonneborn (Tarrytown N.Y.), KRYSTOL 550 mineral oil from Petrochem Carless Limited (Surrey, England), and CALSOL 550 naphthenic oil from Calumet Specialty Products Partners, LP (Indianapolis, Ind.).

The hot melt adhesive composition optionally includes from 0% by weight to no greater than about 20% by weight, no greater than about 15% by weight, no greater than about 12% by weight, from about 0.5% by weight to about 10% by weight, from about 1% by weight to about 10% by weight, or even from about 2% by weight to about 5% by weight oil.

Polybutene

The hot melt adhesive composition optionally includes polybutene having a weight average molecular weight no greater than about 2000 grams per mole. Useful polybutenes are commercially available under a variety of trade designations including, e.g., TPC 595 from TPC Group (Houston Tex.), the INDOPOL series of trade designations from Ineos Europe, Limited (Belgium), and the PARAPOL series of trade designations from ExxonMobil Chemical Company (Houston, Tex.).

The hot melt adhesive composition optionally includes from 0% by weight to no greater than about 20% by weight, no greater than about 15% by weight, no greater than about 12% by weight, from about 0.5% by weight to about 10% by weight, from about 1% by weight to about 10% by weight, or even from about 2% by weight to about 5% by weight polybutene.

Tackifying Agent

The hot melt adhesive composition optionally includes a tackifying agent. Useful tackifying agents exhibit a Tg of no greater than 90° C., no greater than 80° C., no greater than 70° C., no greater than 60° C., or even no greater than 50° C., and Ring and Ball softening point of less than about 160° C. Suitable classes of tackifying agents include, e.g., aromatic, aliphatic and cycloaliphatic hydrocarbon resins, mixed aromatic and aliphatic modified hydrocarbon resins, aromatic modified aliphatic hydrocarbon resins, and hydrogenated versions thereof; terpenes, modified terpenes and hydrogenated versions thereof; natural rosins, modified rosins, rosin esters, and hydrogenated versions thereof; low molecular weight polylactic acid; and combinations thereof. Examples of useful natural and modified rosins include gum rosin, wood rosin, tall oil rosin, distilled rosin, hydrogenated rosin, dimerized rosin, and polymerized rosin. Examples of useful rosin esters include e.g., glycerol esters of pale wood rosin, glycerol esters of hydrogenated rosin, glycerol esters of polymerized rosin, pentaerythritol esters of natural and modified rosins including pentaerythritol esters of pale wood rosin, pentaerythritol esters of hydrogenated rosin, pentaerythritol esters of tall oil rosin, phenolic-modified pentaerythritol esters of rosin, and combinations thereof. Examples of useful polyterpene resins include polyterpene resins having a softening point, as determined by ASTM method E28-58T, of from about 10° C. to about 160° C., hydrogenated polyterpene resins, and copolymers and terpolymers of natural terpenes (e.g. styrene-terpene, alpha-methyl styrene-terpene and vinyl toluene-terpene), and combinations thereof. Examples of useful aliphatic and cycloaliphatic petroleum hydrocarbon resins include aliphatic and cycloaliphatic petroleum hydrocarbon resins having Ring and Ball softening points of from about 10° C. to 160° C., the hydrogenated derivatives thereof, and combinations thereof. Suitable aliphatic and cycloaliphatic petroleum hydrocarbon resins include, e.g., branched, unbranched, and cyclic C5 resins, C9 resins, and C10 resins.

Useful tackifying agents are commercially available under a variety of trade designations including, e.g., the ESCOREZ series of trade designations from ExxonMobil Chemical Company (Houston, Tex.) including, e.g., ESCOREZ 1310LC, ESCOREZ 5400, ESCOREZ 5637, ESCOREZ 5415, ESCOREZ 5600, ESCOREZ 5615, and ESCOREZ 5690, the EASTOTAC series of trade designations from Eastman Chemical Company (Kingsport, Tenn.) including, e.g., EASTOTAC H-100R, EASTOTAC H-100L, and EASTOTAC H130W, the WINGTACK series of trade designations from Cray Valley HSC (Exton, Pa.) including, e.g., WINGTACK 86, WINGTACK EXTRA, and WINGTACK 95, the PICCOTAC series of trade designations from Eastman Chemical Company (Kingsport, Tenn.) including, e.g., PICCOTAC 8095 and 1115, the ARKON series of trade designations from Arkawa Europe GmbH (Germany) including, e.g., ARKON P-125, the REGALITE and REGALREZ series of trade designations from Eastman Chemical Company including, e.g., REGALITE R1125 and REGALREZ 1126, and the RESINALL series of trade designations from Resinall Corp (Severn, N.C.) including RESINALL R1030.

Useful tackifying agents that are liquid at room temperature (i.e., from 20° F. to 22° F.) include, e.g., REGALREZ 1018 hydrocarbon resin from Eastman Chemical Company, PICCOLASTIC A5 hydrocarbon resin from Eastman Chemical Company, and WINGTACK 10 from Cray Valley (Exton, Pa.).

The hot melt adhesive composition optionally includes at least about 1% by weight, at least 5% by weight, at least about 10% by weight, at least about 15% by weight, at least about 20% by weight, no greater than about 40% by weight, no greater than about 35% by weight, no greater than about 30% by weight, no greater than about 25% by weight, from about 15% by weight to about 30% by weight, or even from about 20% by weight to about 25% by weight tackifying agent.

For some hot melt adhesive compositions that include at least 55% by weight semi-crystalline polypropylene polymer useful amounts of the optional tackifying agent include from about 0% by weight to no greater than about 30% by weight, from 1% by weight to no greater than about 30% by weight, from about 1% by weight to about 20% by weight, from about 1% by weight to about 15% by weight, from about 1% by weight to about 10% by weight, no greater than 10% by weight, no greater than about 7% by weight, or even no greater than about 0.5% by weight.

Additives

The hot melt adhesive composition optionally includes a variety of additional components including, e.g., antioxidants, stabilizers, additional polymers, adhesion promoters, ultraviolet light stabilizers, rheology modifiers, corrosion inhibitors, colorants (e.g., pigments and dyes), fillers, flame retardants, nucleating agents, and combinations thereof.

Useful antioxidants include, e.g., pentaerythritol tetrakis [3,(3,5-di-tert-butyl-4-hydroxyphenyl)propionate], 2,2'-methylene bis(4-methyl-6-tert-butylphenol), phosphites including, e.g., tris-(p-nonylphenyl)-phosphite (TNPP) and bis(2,4-di-tert-butylphenyl)4,4'-diphenylene-diphosphonite, di-stearyl-3,3'-thiodipropionate (DSTDP), and combinations thereof. Useful antioxidants are commercially available under a variety of trade designations including, e.g., the IRGANOX series of trade designations including, e.g., IRGANOX 1010, IRGANOX 565, and IRGANOX 1076 hindered phenolic antioxidants, and IRGAFOS 168 phosphite antioxidant, all of which are available from BASF Corporation (Florham Park, N.J., and ETHYL 702 4,4'-methylene bis(2,6-di-tert-butylphenol), which is available from Albemarle Corporation (Baton Rouge, La.). When present, the adhesive composition preferably includes from about 0.1% by weight to about 2% by weight antioxidant.

Useful additional polymers include, e.g., homopolymers, copolymers, and terpolymers, thermoplastic polymers including, e.g., other polyolefins (e.g., high viscosity polyolefins (e.g., high viscosity propylene and ethylene polymers), Ziegler-Natta catalyzed amorphous polyalphaolefins, (e.g., amorphous propylene and ethylene polymers), and combinations thereof), elastomers including, e.g., elastomeric block copolymers (e.g., elastomeric block copolymers that includes styrene (e.g., styrene-butadiene-styrene, styrene-isoprene-styrene, styrene-ethylene/butene-styrene, styrene-ethylene/propylene-styrene and combinations thereof), metallocene-based elastomeric block copolymers, and combinations thereof), and functionalized versions thereof, and combinations thereof.

High viscosity polymers exhibit a viscosity greater than 100,000 at 121° C. Useful additional high viscosity polyolefin polymers include, e.g., high viscosity amorphous polyalphaolefins, high viscosity crystalline polyolefins, high viscosity semi-crystalline polyolefins, and combinations thereof. Suitable high viscosity polyolefins the L-MODU series of trade designations from Idemitsu Kosan Co., Ltd (Japan) including, e.g., L-MODU S400, S600, and S901 propylene homopolymers, and the VISTAMAXX propylene-ethylene copolymers from ExxonMobil Chemical Company (Houston, Tex.) including, e.g., VISTAMAXX 6202, 3980, and 2330.

Ziegler Natta catalyzed amorphous polyalphaolefin polymers are commercially available under a variety of trade designations including, e.g., the REXTAC series of trade designations available from Rextac LLC (Odessa, Tex.) and the EASTOFLEX and AERAFIN series of trade designations from Eastman Chemical Company (Kingsport Tenn.).

The hot melt adhesive composition optionally includes no greater than about 10% by weight, from about 1% by weight to no greater than about 7% by weight, or even no greater than about 5% by weight of a polyolefin polymer that is other than a semi-crystalline propylene polymer.

Useful elastomeric block copolymers are available under a variety of trade designations including, e.g., KRATON G 1657 styrene-ethylene/butylene-styrene block copolymer and KRATON G 1652 styrene-ethylene/butylene-styrene block copolymer from Kraton Polymers U.S. LLC (Houston, Tex.), and VECTOR 4411 styrene-isoprene-styrene block copolymer from TSRC Dexco Polymers LP (Taipei City, Taiwan R.O.C). The hot melt adhesive composition optionally includes from about 1% by weight to about 10% by weight, or even from about 4% by weight to about 10% by weight block copolymer that includes styrene.

The hot melt adhesive composition preferably is free of an ethylene-ethylenically unsaturated ester copolymer such as ethylene vinyl acetate, ethylene acrylate, ethylene methacrylate, and ethylene butyl acrylate. When an ethylene-ethylenically unsaturated ester copolymer is present in the hot melt adhesive composition, it preferably is present in an amount of less than 8% by weight, no greater than 5% by weight, no greater than 3% by weight, or even no greater than 1% by weight.

Uses

The hot melt adhesive composition can be applied to or incorporated in a variety of articles including, e.g., fibers, substrates made from fibers (e.g., virgin fibers, recycled fibers, synthetic polymer fibers (e.g., nylon, rayon, polyesters, acrylics, polypropylenes, polyethylene, polyvinyl chloride, polyurethane), cellulose fibers (e.g., natural cellulose fibers such as wood pulp), natural fibers (e.g., cotton, silk and wool), and glass fibers, and combinations thereof), release liners, porous substrates, cellulose substrates, sheets (e.g., paper, and fiber sheets), paper products, woven and nonwoven webs (e.g., webs made from fibers (e.g., yarn, thread, filaments, microfibers, blown fibers, and spun fibers) perforated films, and combinations thereof), tape backings, and combinations thereof.

The hot melt adhesive composition is useful for bonding a variety of substrates including, e.g., cardboard, coated cardboard, paperboard, fiber board, virgin and recycled kraft, high and low density kraft, chipboard, treated and coated kraft and chipboard, and corrugated versions of the same, clay coated chipboard carton stock, composites, leather, fibers and substrates made from fibers (e.g., virgin fibers, recycled fibers, synthetic polymer fibers, cellulose fibers, and combinations thereof), release liners, porous substrates (e.g., woven webs, nonwoven webs, and perforated films), cellulose substrates, sheets (e.g., paper, and fiber sheets), paper products, tape backings, and combinations thereof.

The hot melt adhesive composition is useful for bonding a first substrate to a second substrate in a variety of applications and constructions including, e.g., packaging, bags, boxes, cartons, cases, trays, multi-wall bags, articles that include attachments (e.g., straws attached to drink boxes), ream wrap, cigarettes (e.g., plug wrap), filters (e.g., pleated filters and filter frames), bookbinding, paper products including, e.g., paper towels (e.g., multiple use towels), toilet paper, facial tissue, wipes, tissues, towels (e.g., paper towels), and combinations thereof.

The hot melt adhesive composition can be applied to a substrate in any useful form including, e.g., as a coating (e.g., a continuous coatings and discontinuous coatings (e.g., random, pattern, and array)), as a bead, as a film (e.g., a continuous films and discontinuous films), and combinations thereof, using any suitable application method including, e.g., slot coating, spray coating (e.g., spiral spray, random spraying, and random fiberization (e.g., melt blowing), foaming, extrusion (e.g., applying a bead, fine line extrusion, single screw extrusion, and twin screw extrusion), wheel application, noncontact coating, contacting coating, gravure, engraved roller, roll coating, transfer coating, screen printing, flexographic, "on demand" application methods, and combinations thereof.

In on demand hot melt application systems (which are also referred to as "tank free" and "tankless" systems), hot melt compositions are fed in a solid state (e.g., pellets), to a relatively small heating vessel (relative to traditional hot melt applications systems that include a pot) where the hot melt composition is melted and, typically shortly thereafter, the molten liquid is applied to a substrate. In on demand systems, a relatively large quantity of hot melt composition typically does not remain in a molten state for an extended period of time. In many existing on demand systems, the volume of molten hot melt composition is no greater than about 1 liter, or even no greater than about 500 milliliters, and the hot melt composition is maintained in a molten state for a relatively brief period of time, including, e.g., less than two hours, less than one hour, or even less than 30 minutes. Suitable on demand hot melt adhesive application systems include, e.g., InvisiPac Tank-Free Hot Melt Delivery System from Graco Minnesota Inc. (Minneapolis, Minn.) and the Freedom Hot Melt Dispensing System from Nordson Corporation (Westlake, Ohio). On demand hot melt adhesive application systems are described in U.S. Patent Publication Nos. 2013-0105039, 2013-0112709, 2013-0112279, and 2014-0042182, and U.S. Pat. No. 8,201,717, and incorporated herein.

The invention will now be described by way of the following examples. All parts, ratios, percentages and amounts stated in the Examples are by weight unless otherwise specified.

EXAMPLES

Test Procedures

Test procedures used in the examples include the following. All ratios and percentages are by weight unless otherwise indicated. The procedures are conducted at room temperature (i.e., an ambient temperature of from about 20° C. to about 25° C.) and ambient humidity (i.e., from 30% to 70%) unless otherwise specified.

Method for Determining Molecular Weight

Molecular weights (Mn, Mw, and Mz) are determined using a Polymer Labs PL-GPC 220 High Temperature Size Exclusion Chromatograph (HT-SEC) operating at 160° C. with 1,2,4-trichlorobenzene (TCB) as the mobile phase. The system contains three PL-gel mixed B columns in series and is equipped with a Refractive Index (RI) detector. The SEC operates at a flow rate of 1.0 ml/min with an injection volume of 100 µL. All HT-SEC samples are prepared with a concentration of 4.0 mg/ml. Molecular weights are calculated from the Mark-Houwink relation using known polystyrene standards. For polystyrene the Mark-Houwink parameters are K=0.000121 and $\alpha$=0.707; for polypropylene the Mark-Houwink parameters are, K=0.000190 and $\alpha$=0.725. The results are reported in grains per mole (g/mole).

Viscosity Test Method

Viscosity is determined in accordance with ASTM D-3236 entitled, "Standard Test Method for Apparent viscosity of H-lot Melt Adhesives and Coating Materials," (Oct. 31, 1988), using a Brookfield viscometer, a Brookfield Thermosel heated sample chamber, and a number 27 spindle. The results are reported in centipoise (cP).

Set Time Test Method

A bead of adhesive composition measuring 5.08 cm by 0.24 cm is applied to a first substrate of RockTenn 56SK-23ME-56SK high performance 44 pound ECT 87% virgin liner board using a MEC ASM-15N Hot Melt Bond Simulator at 177° C. Two seconds after the bead of adhesive is applied to the first substrate, the bead of adhesive is contacted with the second substrate of RockTenn 56SK-23ME-56SK high performance 44 pound ECT 87% virgin liner board, which is then pressed against the first substrate with a pressure of 0.21 MPa and for a period of time (referred to herein as the compression time). The Bond Simulator timer is started when the substrates are compressed. After a pre-programmed compression time the instrument separates the two substrates by pulling on the second substrate in the Z direction and holding the first substrate in a fixed position and the force required to separate the substrates and the amount of fiber tear present on the adhesive composition is measured. Samples are run in triplicate at each compression time. Initially, the compression time is 0.5 seconds. If the three samples fail to exhibit greater than 50% Fiber Tear for each sample, the compression time is increased by 0.1 second and the test method is repeated until greater than 50% fiber tear is noted for all three samples. The set time is recorded as the compression time at which the three samples achieve greater than 50% fiber tear immediately upon separation. The set time is recorded in seconds.

Heat Stress Resistance Test Method

Heat stress resistance is measured according to standard number IOPP T-3006 entitled, "Suggested Test Method for Determining the Heat Stress Resistance of Hot Melt Adhesives," using a starting temperature of 46° C. (115° F.), a 200 gram load per sample, and five bonded samples per adhesive. After each 24 hour period, the number of samples that are no longer supporting the weight is recorded, and the temperature is increased by 2.8° C. (5.0° F.), The pass temperature for each adhesive, which is defined as the maximum temperature at which 80% of the samples remain bonded, is the heat stress resistance and is reported in degrees Celsius (° C.).

Fiber Tear Test Method

The percentage fiber tear is the percentage of fiber that covers the area of the adhesive after two substrates, which have been previously bonded together through the adhesive, are separated by force. The percentage of fiber tear exhibited by an adhesive composition is determined as follows. A bead of the adhesive composition measuring 15.24 cm (6 inch)× 0.24 cm (3/32 inch) is applied to a first substrate of RockTenn 56SK-23ME-56SK 44 pound ECT 87% virgin liner board, using a ROCKTENN bond simulator at the specified application temperature. Two seconds after the bead of adhesive is applied to the first substrate, the bead of adhesive is contacted with a second substrate of RockTenn 56SK-23ME-56SK 44 pound ECT 87% virgin liner board, which is pressed against the adhesive and the first substrate with a pressure of 0.21 MPa (30 pounds per square inch (psi)) for a period of 2 seconds. The resulting constructions are then conditioned at room temperature for at least 4 hours and then conditioned at the specified test temperature for at least 12 hours. The substrates of the construction are then separated from one another at the conditioning temperature (e.g., immediately after removing the sample from the conditioning chamber) by pulling the two substrates apart from one another by hand. The surface of the adhesive composition is observed and the percent of the surface area of the adhesive composition that is covered by fibers is determined and recorded. A minimum of five samples are prepared and tested for each hot melt adhesive composition. The results are reported in units of % fiber tear.

Thermal Stability Test Method

A 200 gram sample of hot melt adhesive composition is placed in a glass beaker (uncovered) and conditioned in a temperature controlled, forced air oven at 177° C. for 200 hours. The molten sample is removed from the oven. The molten sample is observed for the presence of gel, surface skin formation, and charring. The observations are recorded.

The sample is then tested according to the Viscosity test method and the measured viscosity is reported in centipoise.

Thermal stability is determined by change in viscosity and the presence or absence of charring or skinning.

Melting Point Test Method

The melting point is determined according to ASTM D-3461 entitled, "Standard Test Method for Softening Point of Asphalt and Pitch (Mettler Cup and Ball Method)" with a heating rate of 2° C. per minute.

Gardner Color

A sample is tested (in the molten state) to determine Gardner color by comparing the color of the sample against the Gardner Color Standards as set forth in ASTM D-1544. The comparison is made using a Gardner Delta Comparator equipped with an Illuminator available from Pacific Scientific (Bethesda, Md.). The result is reported as the number corresponding to the Gardner Color Standard.

Examples 1-4

Hot melt adhesive compositions of Examples 1-4 were prepared by combining LINXAR 127 propylene-hexene copolymer (ExxonMobil Chemical Company, Houston, Tex.), wax, oil, and antioxidant in the amounts (in % by weight) and of the types specified in Table 1, and heating the same to from 175° C. to 190° C. with mixing.

The hot melt adhesive compositions of Examples 1-4 were tested according to the Viscosity, Set Time, Heat Stress Resistance, and Fiber Tear test methods. The results are reported in Table 1.

TABLE 1

|  | Example | | | |
| --- | --- | --- | --- | --- |
|  | 1 | 2 | 3 | 4 |
| LINXAR 127[1] | 71.8 | 72 | 77 | 71 |
| CALSOL 550[2] | 5 | 9.8 | 0 | 7.8 |
| EPOLENE N-21[3] | 15 | 15 | 19.8 | 18 |
| EPOLENE N-15[4] | 5 | 0 | 0 | 0 |
| WESTLAKE E-43[5] | 3 | 3 | 3 | 3 |
| IRGANOX 1010[6] | 0 | 0.2 | 0.2 | 0.2 |
| EVERNOX 10[7] | 0.2 | 0 | 0 | 0 |
| IRGANOX 1076[8] | 0 | 0 | 0 | 0 |
| Viscosity @ 177° C. (cP) | 966 | 680 | 940 | 735 |
| Set Time (sec) | 1.0 | 1.7 | 1.1 | 1.4 |
| Heat Stress Resistance (° C.) | 57 | 63 | >85 | 79 |
| −29° C. | 80 | 55 | 92 | 94 |
| −18° C. | 80 | 80 | 98 | 100 |
| 4° C. | 100 | 98 | 100 | 100 |
| 49° C. | 100 | NT | NT | NT |
| 54° C. | NT | 100 | 100 | 100 |
| 60° C. | 100 | 100 | 100 | 100 |
| 66° C. | NT | 98 | NT | NT |
| 71° C. | NT | 86 | 93 | 91 |

[1]= LINXAR 127 propylene-hexene copolymer having a density of 0.860 g/cm³, a viscosity of 825 cP at 190° C., and a peak melting temperature of 125° C. (ExxonMobil Chemical Company, Houston, Texas)
[2]= CALSOL 550 naphthenic oil (Calumet Specialty Products Partners, LP, Indianapolis, Indiana)
[3]= EPOLENE N-21 polyethylene wax (Westlake Chemical Corporation, Houston, Texas)
[4]= EPOLENE N-15 polypropylene wax (Westlake Chemical Corporation)
[5]= WESTLAKE E-43 maleic anhydride modified polypropylene wax (Westlake Chemical Corporation)
[6]= IRGANOX 1010 hindered phenolic antioxidant (BASF Corporation, Florham Park, New Jersey)
[7]= EVERNOX 10 hindered phenolic antioxidant (Everspring Chemical, Taichung, Taiwan)
[8]= IRGANOX 1076 hindered phenolic antioxidant (BASF Corporation, Florham Park, New Jersey)
NT = Not Tested Examples 5-8

Hot melt adhesive compositions of Examples 5-8 were prepared by combining LINXAR 127 propylene-hexene copolymer (ExxonMobil Chemical Company, Houston, Tex.), wax, oil, antioxidant and tackifying agent in the amounts (in % by weight) and of the types specified in Table 2, and heating the same to from 175° C. to 190° C. with mixing.

The hot melt adhesive compositions of Examples 5-8 were tested according to the Viscosity, Set Time, Heat Stress Resistance, and Fiber Tear test methods. The results are reported in Table 2.

TABLE 2

|  | Example | | | |
| --- | --- | --- | --- | --- |
|  | 5 | 6 | 7 | 8 |
| LINXAR 127 | 68.8 | 68.8 | 63.8 | 63.8 |
| EPOLENE N-21 | 20 | 23 | 20 | 23 |
| CALSOL 550 | 3 | 0 | 3 | 0 |
| EPOLENE N-15 | 5 | 5 | 5 | 5 |
| WESTLAKE E-43 | 3 | 3 | 3 | 3 |
| IRGANOX 1010 | 0.2 | 0.2 | 0.2 | 0.2 |
| ESCOREZ 5400[9] | 0 | 0 | 5 | 5 |
| Viscosity at 177° C. (cP) | 862 | 973 | 976 | 908 |
| Viscosity at 190° C. (cP) | 747 | 722 | 601 | 699 |
| Set Time (sec) | 0.8 | 0.8 | 1.0 | 0.8 |
| Heat Stress Resistance (° C.) | >82 | >82 | >82 | >82 |
| % Fiber Tear | | | | |
| −29° C. | 94 | 93 | 66 | 29 |
| −18° C. | 95 | 54 | 70 | 57 |
| 4° C. | 98 | 97 | 100 | 100 |
| Room Temperature | 92 | 100 | 100 | 99 |
| 54° C. | 100 | 100 | 100 | 100 |
| 60° C. | 100 | 100 | 100 | 100 |
| 66° C. | 100 | 100 | 100 | 100 |
| 71° C. | 100 | 100 | 100 | 100 |

[9]= ESCOREZ 5400 cycloaliphatic hydrocarbon resin having a Tg of 52° C. (ExxonMobil Corporation, Houston, Texas)

Examples 9-13

Hot melt adhesive compositions of Examples 9-13 were prepared by combining LINXAR 127 propylene-hexene copolymer (ExxonMobil Chemical Company, Houston, Tex.), wax, oil (where present), and antioxidant in the amounts (in % by weight) and of the types specified in Table 3, and heating the same to from 175° C. to 190° C. with mixing.

The hot melt adhesive compositions of Examples 9-13 were tested according to at least one of the Viscosity, Set Time, Heat Stress Resistance, and Fiber Tear test methods. The results are reported in Table 3.

TABLE 3

| | Example | | | | |
|---|---|---|---|---|---|
| | 9 | 10 | 11 | 12 | 13 |
| LINXAR 127 | 68.8 | 68.8 | 70 | 77 | 68.8 |
| EPOLENE N-21 | 10 | 10 | 10 | 10 | 10 |
| POLYWAX 3000[10] | 13 | 0 | 0 | 0 | 0 |
| SX-105[11] | 0 | 13 | 0 | 0 | 18 |
| EPOLENE N-15 | 5 | 5 | 0 | 0 | 0 |
| WESTLAKE E-43 | 3 | 3 | 3 | 3 | 3 |
| FR-6513[12] | 0 | 0 | 8.0 | 9.8 | 0 |
| CALSOL 550 | 0 | 0 | 8.8 | 0 | 0 |
| IRGANOX 1010 | 0.2 | 0.2 | 0.2 | 0.2 | 0.2 |
| Properties | | | | | |
| Viscosity at 149° C. (cP) | NT | NT | NT | NT | 1385 |
| Viscosity at 177° C. (cP) | 790 | 587 | 510 | 630 | 520 |
| Viscosity at 190° C. (cP) | 626 | 470 | NT | NT | NT |
| Set Time (sec) | 0.5 | 0.7 | 1.7 | 1.2 | 1.0 |
| Heat Stress Resistance (° C.) | 76 | 76 | NT | NT | >57 |
| % Fiber Tear | | | | | |
| Temperature | | | | | |
| −29° C. | 41 | 21 | 95 | 85 | 24 |
| −18° C. | 27 | 15 | 100 | 86 | 28 |
| 4° C. | 82 | 55 | 100 | 100 | 50 |
| Room Temperature | 89 | 62 | 100 | 100 | 100 |
| 60° C. | 97 | 98 | 100 | 100 | 100 |
| 66° C. | 96 | 97 | 84 | 100 | 100 |
| 71° C. | 96 | 87 | NT | NT | NT |

[10]= POLYWAX 3000 polyethylene wax (Baker Hughes, Houston, Texas)
[11]= SX-105 Fischer Tropsch wax (Shell Malaysia Ltd., Kuala Lumpur, Malaysia)
[12]= FR-6513 paraffin wax (Calumet Specialty Products Partners, LP, Indianapolis, Indiana)

Examples 14-17

Hot melt adhesive compositions of Examples 14-17 were prepared by combining the components in the amounts (in % by weight) and of the types specified in Table 4, and heating the same to from 175° C. to 190° C. with mixing.

The hot melt adhesive compositions of Examples 14-17 were tested according to at least one of the Viscosity, Set Time, Heat Stress Resistance, and Fiber Tear test methods. The results are reported in Table 4.

TABLE 4

| | Example | | | |
|---|---|---|---|---|
| | 14 | 15 | 16 | 17 |
| VISTAMAXX 8880[13] | 50.0 | 49.5 | 45.5 | 56.5 |
| VISTAMAXX 3980FL[14] | 2.5 | 0.0 | 0.0 | 0.00 |
| VISTAMAXX 6202[15] | 0.0 | 0.0 | 0.0 | 2.5 |
| KRATON G1657[16] | 0.0 | 5.0 | 5.0 | 0.00 |
| ESCOREZ 5637[17] | 22.0 | 22.0 | 22.0 | 22.5 |
| AC 596P[18] | 3.0 | 3.0 | 3.0 | 3.00 |
| SARAWAX SX 105[19] | 5.0 | 5.0 | 5.0 | 5.00 |
| EPOLENE N21 | 17.0 | 15.0 | 19.0 | 10.0 |
| IRGANOX 1010 | 0.5 | 0.5 | 0.50 | 0.50 |
| Initial Viscosity at 350° F. (cP) | 985 | 1242 | 1137 | 1191 |

TABLE 4-continued

| | Example | | | |
|---|---|---|---|---|
| | 14 | 15 | 16 | 17 |
| Heat Stress Resistance (° C.) | 71 | 68 | 68 | 68 |
| Initial Gardner Color | 1 | 2 | 1-2 | 1-2 |
| Set Time @ 2 seconds Open (in seconds) | 1.1 | 1.2 | 1.1 | 1.4 |
| Specific Gravity | 0.92 | 0.93 | 0.93 | 0.92 |
| % Fiber Tear | | | | |
| −43° C. | 94 | 90 | 83 | 75 |
| −29° C. | 15 | 66 | 84 | 66 |
| −18° C. | 5 | 70 | 84 | 59 |
| 4° C. | 78 | 94 | 94 | 95 |
| 22° C. | 98 | 99 | 95 | 99 |
| 55° C. | 100 | 100 | 100 | 100 |
| 60° C. | 100 | 100 | 96 | 100 |
| 65° C. | 100 | 100 | 95 | 100 |

[13]= VISTAMAXX 8880 metallocene-catalyzed propylene-ethylene copolymer (ExxonMobil Chemical Company, Houston, Texas)
[14]= VISTAMAXX 3980FL metallocene-catalyzed polypropylene elastomer (ExxonMobil)
[15]= VISTAMAXX 6202 propylene-ethylene copolymer (ExxonMobil)
[16]= KRATON G1657 styrene-ethylene-butylene-styrene block copolymer (Kraton Polymers LLC, Houston, Texas)
[17]= ESCOREZ 5637 aromatic modified cycloaliphatic hydrocarbon resin (ExxonMobil)
[18]= AC 596P maleated polyethylene wax (Honeywell Int'l Inc., Morristown, New Jersey)
[19]= SARAWAX SX 105 Fischer-Tropsch wax (Shell Malaysia Ltd., Kuala Lumpur, Malaysia)

Examples 18 and 19

Hot melt adhesive compositions of Examples 18 and 19 were prepared by combining the components in the amounts (in % by weight) and of the types specified in Table 5, and heating the same to from 175° C. to 190° C. with mixing.

The hot melt adhesive compositions of Examples 18 and 19 were tested according to at least one of the Viscosity, Set Time, and Fiber Tear test methods. The results are reported in Table 5.

TABLE 5

| | Example | |
|---|---|---|
| | 18 | 19 |
| VISTAMAXX 8880 | 47.5 | 45.5 |
| KRATON G1657 | 6.0 | 7.0 |
| ESCOREZ 5637 | 22.0 | 22.0 |
| AC 596P | 3.0 | 3.0 |
| SARAWAX SX105 | 8.0 | 9.0 |
| EPOLENE N21 | 13.0 | 13.0 |
| IRGANOX 1010 | 0.5 | 0.5 |
| Viscosity at 177° C. (cP) | 1295 | 1435 |
| Initial Gardner Color | 3 | 3 |
| Set Time at 2 seconds open time (seconds) | 1 | 0.9 |
| Fiber Tear (%) | | |
| −43° C. | 94 | 99 |
| −29° C. | 75 | 84 |
| −18° C. | 78 | 89 |
| 4° C. | 86 | 94 |
| 22° C. | 100 | 100 |
| 54° C. | 95 | 100 |
| 60° C. | 100 | 98 |
| 65° C. | 100 | 99 |

Examples 20-22

Hot melt adhesive compositions of Examples 20-22 were prepared by combining the components in the amounts (in % by weight) and of the types specified in Table 6, and heating the same to from 175° C. to 190° C. with mixing.

The hot melt adhesive compositions of Examples 20-22 were tested according to at least one of the Viscosity, Set Time, and Fiber Tear test methods. The results are reported in

TABLE 6

|  | Example | | |
|---|---|---|---|
|  | 20 | 21 | 22 |
| VISTAMAXX 8880 | 47.5 | 48.5 | 50.5 |
| KRATON G1657 | 7 | 7 | 7 |
| RESINAL R1030[20] | 22 | 22 | 20 |
| AC 596P | 1 | 0 | 0 |
| SARAWAX SX105 | 9 | 9 | 9 |
| EPOLENE N21 | 13 | 13 | 13 |
| IRGANOX 1010 | 0.5 | 0.5 | 0.5 |
| Viscosity at 177° C. (cP) | 1460 | 1435 | 1480 |
| Set Time at 2 seconds open time (seconds) | 1.0 | 1.0 | 1.0 |
| Fiber Tear (%) | | | |
| −43° C. | 92 | 91 | 93 |
| −29° C. | 93 | 85 | 85 |
| −18° C. | 86 | 92 | 94 |
| 4° C. | 95 | 93 | 94 |
| 22° C. | 92 | 93 | 92 |
| 54° C. | 100 | 98 | 97 |
| 60° C. | 99 | 98 | 100 |
| 66° C. | 98 | 99 | 98 |

[20]= RESINAL R1030 (Resinall Corp, Severn, North Carolina)

Other embodiments are in the claims. All documents referred to herein are incorporated in their entirety.

1. A hot melt adhesive composition comprising at least 40% by weight of an unmodified, semi-crystalline propylene polymer comprising at least 50% by weight propylene, at least 15% by weight non-functionalized wax, the non-functionalized wax comprising a first non-functionalized wax and a second non-functionalized wax different from the first non-functionalized wax, and no greater than 8% by weight of an ethylene-ethylenically unsaturated ester copolymer.

2. A hot melt adhesive composition comprising at least 40% by weight of an unmodified, semi-crystalline propylene polymer comprising at least 50% by weight propylene, at least 15% by weight non-functionalized wax, from 0% by weight to no greater than 10% by weight, functionalized wax, and from 1% by weight to 10% by weight elastomeric block copolymer that includes styrene.

3. A hot melt adhesive composition that includes at least 55% by weight of a semi-crystalline propylene polymer comprising at least 50% by weight propylene, and greater than 20% by weight wax, the wax comprising a first wax, a second wax different from the first wax, and from 0% by weight to no greater than 10% by weight, based on the weight of the hot melt adhesive composition, functionalized wax, the hot melt adhesive composition exhibiting a set time of no greater than 2 seconds.

4. The hot melt adhesive composition of any one of paragraphs 1 and 3 further comprising an elastomeric block copolymer comprising styrene.

5. The hot melt adhesive composition of any one of paragraphs 2 and 4, wherein the elastomeric block copolymer is selected from the group consisting of styrene-ethylene/butylene-styrene block copolymer, styrene-ethylene/propylene-styrene block copolymer, and combinations thereof.

6. The hot melt adhesive composition of any one of paragraphs 1-5 comprising at least 45% by weight unmodified, semi-crystalline propylene polymer.

7. The hot melt adhesive composition of any one of paragraphs 1-5 comprising at least 50% by weight unmodified, semi-crystalline propylene polymer.

8. The hot melt adhesive composition of any one of paragraphs 1-5 comprising at least 55% by weight unmodified, semi-crystalline propylene polymer.

9. The hot melt adhesive composition of any one of paragraphs 1-8, wherein the first non-functionalized wax comprises polyethylene wax, Fischer Tropsch wax or a combination thereof.

10. The hot melt adhesive composition of any one of paragraphs 1-9, wherein the first non-functionalized wax has a melting point greater than 100° C.

11. The hot melt adhesive composition of any one of paragraphs 1-10, wherein the second non-functionalized wax has a melting point greater than 115° C.

12. The hot melt adhesive composition of any one of paragraphs 1-11 further comprising a functionalized wax.

13. The hot melt adhesive composition of paragraph 12, wherein the first non-functionalized wax comprises polyethylene wax, Fischer Tropsch wax or a combination thereof, and the functionalized wax comprises maleated polyethylene wax, maleated polypropylene wax, or a combination thereof.

14. The hot melt adhesive composition of any one of paragraphs 1, 2 and 4-13 comprising greater than 20% by weight wax.

15. The hot melt adhesive composition of any one of paragraphs 1, 2 and 4-15, wherein the unmodified, semi-crystalline propylene polymer has a heat of fusion of from 15 J/g to no greater than 50 J/g.

16. The hot melt adhesive composition of any one of paragraphs 1, 2 and 4-15, wherein the composition exhibits a set time no greater than 2 seconds.

17. The hot melt adhesive composition of any one of paragraphs 1-16, wherein the composition exhibits a heat stress resistance of greater than 60° C. and a set time no greater than 2 seconds.

18. The hot melt adhesive composition of any one of paragraphs 1-17, wherein the composition exhibits a heat stress resistance of greater than 60° C., greater than 50% fiber tear at 4° C. and greater than 50% fiber tear at 60° C., and a set time of no greater than 1.5 seconds.

19. The hot melt adhesive composition of any one of paragraphs 1-17, wherein the composition exhibits a heat stress resistance of greater than 71° C., greater than 50% fiber tear at 4° C. and greater than 50% fiber tear at 71° C., and a set time of no greater than 1.5 seconds.

20. The hot melt adhesive composition of any one of paragraphs 1-17, wherein the composition exhibits a heat stress resistance of greater than 71° C., greater than 50% fiber tear at −18° C. and greater than 50% fiber tear at 71° C., and a set time of no greater than 1.5 seconds.

21. The hot melt adhesive composition of any one of paragraphs 1-20 further comprising oil, polybutene, or a combination thereof.

22. The hot melt adhesive composition of any one of paragraphs 1-20, wherein the composition exhibits a viscosity of no greater than 2000 centipoise at 177° C.

23. The hot melt adhesive composition of any one of paragraphs 1-22 comprising from 45% by weight to about 70% by weight unmodified, semi-crystalline propylene polymer, from about 20% by weight to about 35% by weight non-functionalized wax, and from 0% by weight to about 10% by weight functionalized wax.

24. The hot melt adhesive composition of any one of paragraphs 1-17 and 21-23, wherein the composition exhibits a set time of no greater than 1.5 seconds.

25. The hot melt adhesive composition of any one of paragraphs 1-17 and 21-23, wherein the composition exhibits a set time of no greater than 1 second.

26. The hot melt adhesive composition of any one of paragraphs 1-25, comprising from 50% by weight to about 65% by weight unmodified, semi-crystalline polypropylene polymer.

27. The hot melt adhesive composition of any one of paragraphs 1, 2, and 4-26, wherein the unmodified, semi-crystalline propylene polymer comprises an unmodified, metallocene-catalyzed semi-crystalline propylene polymer, an unmodified, non-metallocene heteroaryl-catalyzed semi-crystalline propylene polymer, or a combination thereof.

28. The hot melt adhesive composition of any one of paragraphs 1, 2, and 4-27, wherein the unmodified, semi-crystalline propylene polymer comprises an unmodified, metallocene-catalyzed semi-crystalline propylene copolymer, an unmodified, non-metallocene heteroaryl-catalyzed semi-crystalline propylene copolymer, or a combination thereof.

29. The hot melt adhesive composition of any one of paragraphs 1, 2, and 4-28, wherein the unmodified, semi-crystalline propylene polymer exhibits a viscosity of no greater than 1200 cP at 190° C.

30. The hot melt adhesive composition of any one of paragraphs 1-29, wherein the composition exhibits a heat stress resistance of greater than 60° C., greater than 50% fiber tear at −18° C., and greater than 50% fiber tear at 60° C.

31. The hot melt adhesive composition of any one of paragraphs 1-30, wherein the composition exhibits a viscosity of no greater than 1500 centipoise at 149° C.

32. The hot melt adhesive composition of any one of paragraphs 1-31, wherein the non-functionalized wax comprises a first non-functionalized wax and a second non-functionalized wax different from the first non-functionalized wax.

33. The hot melt adhesive composition of any one of paragraphs 1-32 further comprising from 15% by weight to 30% by weight tackifying agent.

34. A package comprising the hot melt adhesive composition of any one of paragraphs 1-33, a first substrate comprising fibers, and a second substrate comprising fibers, the second substrate bonded to the first substrate through the adhesive composition.

What is claimed is:

1. A hot melt adhesive composition comprising:
   at least 40% by weight of an unmodified, semi-crystalline propylene polymer comprising at least 50% by weight propylene;
   at least 15% by weight non-functionalized wax selected from the group consisting of polyethylene wax, Fischer Tropsch wax, and combinations thereof;
   from 0% by weight to no greater than 10% by weight functionalized wax; and
   from 1% by weight to 10% by weight elastomeric block copolymer comprising styrene.

2. The hot melt adhesive composition of claim 1 wherein the elastomeric block copolymer is selected from the group consisting of styrene-ethylene/butylene-styrene block copolymer, styrene-ethylene/propylene-styrene block copolymer, and combinations thereof.

3. The hot melt adhesive composition of claim 1 comprising at least 45% by weight of the unmodified, semi-crystalline propylene polymer.

4. The hot melt adhesive composition of claim 1 comprising at least 50% by weight of the unmodified, semi-crystalline propylene polymer.

5. The hot melt adhesive composition of claim 1 comprising at least 55% by weight of the unmodified, semi-crystalline propylene polymer.

6. The hot melt adhesive composition of claim 1, wherein the first non-functionalized wax is polyethylene wax.

7. The hot melt adhesive composition of claim 1, wherein the first non-functionalized wax has a melting point greater than 100° C.

8. The hot melt adhesive composition of claim 7, wherein the second non-functionalized wax has a melting point greater than 115° C.

9. The hot melt adhesive composition of claim 1 further comprising a functionalized wax.

10. The hot melt adhesive composition of claim 9, wherein the functionalized wax comprises maleated polyethylene wax, maleated polypropylene wax, or a combination thereof.

11. The hot melt adhesive composition of claim 1 comprising greater than 20% by weight wax.

12. The hot melt adhesive composition of claim 1, wherein the unmodified, semi-crystalline propylene polymer has a heat of fusion of from 15 J/g to no greater than 50 J/g.

13. The hot melt adhesive composition of claim 1, wherein the composition exhibits a set time no greater than 2 seconds.

14. The hot melt adhesive composition of claim 1, wherein the composition exhibits a heat stress resistance of greater than 60° C. and a set time no greater than 1 second.

15. The hot melt adhesive composition of claim 1, wherein the composition exhibits a heat stress resistance of greater than 60° C., greater than 50% fiber tear at 4° C., greater than 50% fiber tear at 60° C., and a set time of no greater than 1.5 seconds.

16. The hot melt adhesive composition of claim 1, wherein the composition exhibits a heat stress resistance of greater than 71° C., greater than 50% fiber tear at 4° C. and greater than 50% fiber tear at 71° C., and a set time of no greater than 1.5 seconds.

17. The hot melt adhesive composition of claim 1 further comprising oil, polybutene, or a combination thereof.

18. The hot melt adhesive composition of claim 1, wherein the composition exhibits a viscosity of no greater than 2000 centipoise at 177° C.

19. The hot melt adhesive composition of claim 1 comprising:
   from 45% by weight to about 70% by weight unmodified, semi-crystalline propylene polymer;
   from about 20% by weight to about 35% by weight non-functionalized wax; and
   from about 1% by weight to about 10% by weight functionalized wax.

20. The hot melt adhesive composition of claim 19, comprising from 50% by weight to about 65% by weight unmodified, semi-crystalline polypropylene polymer.

21. The hot melt adhesive composition of claim 19, wherein the unmodified, semi-crystalline propylene polymer comprises an unmodified, metallocene-catalyzed semi-crystalline propylene copolymer, an unmodified, non-metallocene heteroaryl-catalyzed, semi-crystalline propylene copolymer, or a combination thereof.

22. The hot melt adhesive composition of claim 19, wherein the unmodified, semi-crystalline propylene polymer exhibits a viscosity of no greater than 1200 cP at 190° C.

23. The hot melt adhesive composition of claim 19, wherein the composition exhibits a heat stress resistance of greater than 60° C., greater than 50% fiber tear at −18° C., and greater than 50% fiber tear at 60° C.

24. The hot melt adhesive composition of claim 19, wherein the composition exhibits a viscosity of no greater than 1500 centipoise at 149° C.

25. A package comprising:
the hot melt adhesive composition of claim 1;
a first substrate comprising fibers; and
a second substrate comprising fibers, the second substrate bonded to the first substrate through the adhesive composition.

26. A hot melt adhesive composition comprising:
at least 40% by weight of an unmodified, semi-crystalline propylene polymer comprising at least 50% by weight propylene;
at least 15% by weight non-functionalized wax, the non-functionalized wax being selected from the group consisting of polyethylene wax, Fischer Tropsch wax, and combinations thereof, the non-functionalized wax comprising a first non-functionalized wax and a second non-functionalized wax different from the first non-functionalized wax; and
no greater than 8% by weight of an ethylene-ethylenically unsaturated ester copolymer,
the hot melt adhesive composition exhibiting a heat stress resistance of greater than 60° C. and a set time no greater than 1 second.

27. A hot melt adhesive composition comprising:
at least 40% by weight of an unmodified, semi-crystalline propylene polymer comprising at least 50% by weight propylene;
at least 15% by weight non-functionalized wax, the non-functionalized wax being selected from the group consisting of polyethylene wax, Fischer Tropsch wax, and combinations thereof, the non-functionalized wax comprising a first non-functionalized wax and a second non-functionalized wax different from the first non-functionalized wax; and
no greater than 8% by weight of an ethylene-ethylenically unsaturated ester copolymer,
the hot melt adhesive composition exhibiting a heat stress resistance of greater than 60° C., greater than 50% fiber tear at 4° C., greater than 50% fiber tear at 60° C., and a set time of no greater than 1.5 seconds.

28. A hot melt adhesive composition comprising:
at least 40% by weight of an unmodified, semi-crystalline propylene polymer comprising at least 50% by weight propylene;
at least 15% by weight non-functionalized wax, the non-functionalized wax being selected from the group consisting of polyethylene wax, Fischer Tropsch wax, and combinations thereof, the non-functionalized wax comprising a first non-functionalized wax and a second non-functionalized wax different from the first non-functionalized wax; and
no greater than 8% by weight of an ethylene-ethylenically unsaturated ester copolymer,
the hot melt adhesive composition exhibiting a heat stress resistance of greater than 71° C., greater than 50% fiber tear at 4° C. and greater than 50% fiber tear at 71° C., and a set time of no greater than 1.5 seconds.

29. A hot melt adhesive composition comprising:
from 45% by weight to about 70% by weight unmodified, semi-crystalline propylene polymer comprising at least 50% by weight propylene;
from about 20% by weight to about 35% by weight non-functionalized wax;
at least 15% by weight non-functionalized wax selected from the group consisting of polyethylene wax, Fischer Tropsch wax, and combinations thereof,
the non-functionalized wax comprising a first non-functionalized wax and a second non-functionalized wax different from the first non-functionalized wax;
from about 1% by weight to about 10% by weight functionalized wax; and
no greater than 8% by weight of an ethylene-ethylenically unsaturated ester copolymer,
the composition exhibiting a heat stress resistance of greater than 60° C., greater than 50% fiber tear at −18° C., and greater than 50% fiber tear at 60° C.

30. A hot melt adhesive composition comprising:
from 45% by weight to about 70% by weight unmodified, semi-crystalline propylene polymer comprising at least 50% by weight propylene;
from about 20% by weight to about 35% by weight non-functionalized wax;
at least 15% by weight non-functionalized wax selected from the group consisting of polyethylene wax, Fischer Tropsch wax, and combinations thereof,
the non-functionalized wax comprising a first non-functionalized wax and a second non-functionalized wax different from the first non-functionalized wax;
from about 1% by weight to about 10% by weight functionalized wax; and
no greater than 8% by weight of an ethylene-ethylenically unsaturated ester copolymer,
the hot melt adhesive composition exhibiting a viscosity of no greater than 1500 centipoise at 149° C.

31. A hot melt adhesive composition comprising:
at least 40% by weight of an unmodified, semi-crystalline propylene polymer comprising at least 50% by weight propylene;
at least 15% by weight non-functionalized wax, the non-functionalized wax being selected from the group consisting of polyethylene wax, Fischer Tropsch wax, and combinations thereof, the non-functionalized wax comprising a first non-functionalized wax and a second non-functionalized wax different from the first non-functionalized wax;
no greater than 8% by weight of an ethylene-ethylenically unsaturated ester copolymer; and
an elastomeric block copolymer selected from the group consisting of styrene-ethylene/butylene-styrene block copolymer, styrene-ethylene/propylene-styrene block copolymer, and combinations thereof,
the hot melt adhesive composition exhibiting a set time no greater than 1 second.

* * * * *